UNITED STATES PATENT OFFICE.

GEORGE W. BAKER, OF ABERDEEN, MARYLAND.

METHOD OF CANNING GREEN CORN.

SPECIFICATION forming part of Letters Patent No. 273,436, dated March 6, 1883.

Application filed December 23, 1882. (No specimens.)

*To all whom it may concern:*

Be it known that I, GEORGE W. BAKER, a citizen of the United States of America, residing at Aberdeen, in the county of Harford and State of Maryland, have invented certain new and useful Improvements in Methods of Canning Green Corn, of which the following is a specification.

My invention relates to a method of canning green corn on the cob, the object being to so treat the corn in the whole ear that all the natural flavor, substance, and plumpness of the kernels will be preserved and retained.

It is well known that when sugar-corn reaches that stage of ripeness deemed best for table use the cob contains much milk or juice which has the same flavor and nutritive properties as that in the kernels. Now, by my method it is sought to preserve the corn without disturbing the milk in the cob, and thereby to make the latter serve as an auxiliary in the preservation of the flavor of the kernels.

I desire to state at the outset that I am aware that it has heretofore been proposed to preserve green corn on the cob in cans; but in all processes heretofore employed of which I have knowledge the corn on the cob has been cooked by immersing the ear in a heated liquid—usually a saline solution—substantially in accordance with the well-known processes described by Appert and others. The difficulty with this mode of procedure, so far as corn on the cob is concerned, is that the liquid in which the corn is immersed and cooked, acts during the cooking operation to dissolve out the milk and juices of the same, and, to a certain extent, takes the place of these ingredients in the kernel, and also saturates the cob, thus leaving the article insipid, and noticeably lacking in the freshness of taste and the distinctive flavor which impart to it its agreeable and in a measure nutritious properties as an article of food. It has been my effort to overcome this serious obstacle to the successful preparation of the article in question. This result I have found can be obtained by a process, the novel and distinctive feature of which resides in cooking the corn on the cob in steam, in contradistinction to a liquid, the can containing the corn on the cob and supplied with a very small quantity of water, just sufficient to afford the requisite steam, while leaving the interstices between the ears unfilled, being sealed and subjected to the heat requisite to convert the water into steam, which fills the interstices between the ears and thoroughly cooks the corn, and at the same time acts to coagulate or to bring to a state of semi-solidification the milk or juices within the ears without dissolving out the same, as would be the case were the ears immersed and cooked in a liquid. By this novel step the corn milk and juices are retained in the cooked ears, and are put in a condition in which they will not be dissolved out to any appreciable extent by the saline solution with which the can is subsequently filled for the purpose of preserving the ears from discoloration, &c.

To a better understanding of my improvement, I shall now proceed to describe more specifically and in detail the manner in which I carry the same practically into effect.

When the green corn is in that condition as to ripeness which is deemed best for table use it is gathered from the stalk and the ears are assorted, according to size, into several—say three—lots, so as to have each lot to consist of ears of uniform size, as near as possible. I prefer to put about seven or eight whole ears in each can, because that number packs to good advantage in the round cans which are used. Ordinarily-constructed tin cans are employed of three sizes adapted to suit the assorted sizes of the ears. About six ears are first placed within the can, the larger or knub end of these ears, being entered first, rest on the can-bottom, and then the last ear is entered at the center and between the other ears, tip-end or point-end first, so as to crowd like a wedge. This position of the ears in the can keeps them from moving, and thereby prevents the kernels from being bruised or from bursting, should the can afterward be subjected to rough handling in transportation. It will be observed spaces or interstices of considerable size are left between the ears. A small quantity of water is then poured into the can, leaving the interstices between the ears unfilled. The "cap" is then placed over the can-mouth and sealed by the application of solder. The sealed can is then subjected to heat by immersion in a very hot bath for a given time. This generates within the sealed can steam, which fills the interstices between the ears and cooks the corn on the cobs and the milk or juice within the cobs without dissolving the same from the cob, as inevitably results where the whole ear is cooked in a solution. The can, being removed from the hot bath, is opened, filled or nearly filled with salt-water, quickly closed, and finally sealed. The finally-sealed can is then placed in a steam-chest or "processing-kettle" and again subjected to heat. When taken from the steam-chest the hot can is submerged in a cooling-tub, which condenses the hot expanded fluid contained in the can. As the interstices between the ears are filled with the salt-water when the can is submerged in the cooling-tub, the sudden chilling to which the can is subjected does not cause it to partly collapse as it would do if the interstices were not filled.

This method does not disturb or dissolve out the milk or juice which is in the cob, and consequently the substance within the shell or jacket of each uncut kernel remains undisturbed, and therefore the corn-kernels will retain their natural flavor and sweetness unchanged. I find that the salt-water which fills the interstices prevents discoloration, and the corn comes out handsome in appearance.

Having described my invention, I claim and desire to secure by Letters Patent of the United States—

As an improvement in the art of preserving green corn on the cob in cans, the method of treating the same so as to retain in the preserved ears the milk and juices, which consists in first putting the whole ears into the can, adding water thereto in such small quantity as to leave the interstices between the ears practically unfilled, and sealing, then subjecting said ears to the action of steam generated from said water by the application of heat to the sealed can, whereby not only is the corn on the cob cooked, but the milk and juices are coagulated and retained in the ears, and then opening the can, nearly filling it with salt-water, and finally sealing and processing it, as hereinbefore set forth.

In testimony whereof I affix my signature, in presence of two witnesses, this 20th day of December, 1882.

GEORGE W. BAKER.

Witnesses:
JOHN E. MORRIS,
JNO. T. MADDOX.